United States Patent
Miyahara

(10) Patent No.: US 7,762,645 B2
(45) Date of Patent: Jul. 27, 2010

(54) METHOD OF EVALUATING PERFORMANCE OF OPTICAL SENSOR AND INK JET PRINTING APPARATUS

(75) Inventor: Katsutoshi Miyahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 12/109,794

(22) Filed: Apr. 25, 2008

(65) Prior Publication Data
US 2008/0273203 A1 Nov. 6, 2008

(30) Foreign Application Priority Data
May 1, 2007 (JP) .............................. 2007-120811

(51) Int. Cl.
B41J 29/393 (2006.01)
(52) U.S. Cl. ...................................................... 347/19
(58) Field of Classification Search ................... 347/19; 358/504; 250/559.1, 252.1
See application file for complete search history.

(56) References Cited

U.S. PATENT DOCUMENTS 6,474,767 B1 * 11/2002 Teshigawara et al. ......... 347/19
6,530,640 B1 * 3/2003 Vega et al. ..................... 347/19
7,152,970 B2 12/2006 Hasebe et al.
7,645,010 B2 * 1/2010 Otsuka ......................... 347/15

FOREIGN PATENT DOCUMENTS

JP 05-346626 12/1993
JP 2004-291601 10/2004

* cited by examiner

*Primary Examiner*—Lamson D Nguyen
(74) *Attorney, Agent, or Firm*—Fitzpatrick, Cella, Harper & Scinto

(57) ABSTRACT

Provided are a method of precisely evaluating the performance of an optical sensor including light-emitting elements corresponding to light-emitting wavelengths respectively representing multiple colors as well as a light-receiving element even under a condition in which mists of color inks adhere to the sensor, and a printing apparatus for carrying out the method. To this end, how much the performance of the optical sensor mounted on a carriage decreases is evaluated based on a cumulative number of ejections for each ink color, which number corresponds to the amount of mist, and a degree at which each ink affects each color LED. This makes it possible to precisely evaluate the performance of the optical sensor including the light-emitting elements corresponding to the light-emitting wavelengths respectively representing the multiple colors as well as the light-receiving element even under the condition in which the mists of the color inks adhere to the sensor.

8 Claims, 8 Drawing Sheets

METHOD OF EVALUATING PERFORMANCE OF OPTICAL SENSOR AND INK JET PRINTING APPARATUS

BACKGROUND OF THE INVENTION

1. Field of the Invention

The present invention relates to a method of evaluating the performance of an optical sensor installed in an ink jet printing apparatus.

2. Description of the Related Arts

In recent years, various sensors for detecting and measuring printing conditions of an ink jet printing apparatus depending on the necessity are installed in the apparatus to enhance its image quality, precision for printing operation, and user friendliness. Examples of these sensors include: a sensor for detecting an end position and width (or size) of a printing medium; a sensor for detecting the presence or absence of a printing medium as well as the thickness of a printing medium; and a sensor for measuring the density and the like of a predetermined pattern printed on a printing medium.

The detection of an end position and width of a printing medium is effective for printing an image at an exact location on the printing medium. Particularly in a case of "margin-less printing," in which an image is printed on a printing medium with no margin, it is desirable that the printing apparatus minimize the amount of ink ejected to the outside of the printing medium while preventing a margin from appearing due to shift of printing position. Even in this case, if the printing apparatus is capable of detecting an end position and width of the printing medium precisely, it is possible to control the printing position so as to print the image on the exact location on the printing medium. Thus, the printing apparatus is capable of achieving a highly precise "margin-less printing."

In general, a reflection optical sensor configured of one light-emitting element and one light-receiving element is used for a sensor for detecting an end position of a printing medium. In such optical sensor, light radiated from the light-emitting element is reflected at a printing medium, and the light-receiving element receives the reflected light. Incidentally, an output from the light-receiving element changes depending on the intensity of the reflected light. While the radiated light is reflected at an end portion of the printing medium, the density of the reflected light is lower, and the output from the light-receiving element is accordingly lower. With this taken into consideration, if a threshold value of output for detecting an end portion is beforehand determined, it is possible to detect the end portion through comparison between a result of the output from the light-receiving element and its corresponding position. Carrying out this type of detecting operation at the two side ends of the printing medium enables the width of the printing medium to be calculated as well.

The detection of the thickness of the printing medium is effective for keeping a distance between the ink jet printing head and the printing medium (a distance to the paper) optimal. In a case where a sensor for detecting the thickness of a printing medium detects the thicknesses of printing media to find a thinner printing medium, the printing apparatus makes the printing head come closer to the printing medium, while in the case where a thicker printing medium is found, the printing apparatus makes the printing head go away from the printing medium, by adjustment. Accordingly, it becomes possible for the printing apparatus to keep the distance between the printing head and each printing medium constant even when the printing medium in a variety of thicknesses is loaded thereon. By keeping the distance to the paper constant, it is possible to control, with high precision, landing positions of ink droplets ejected from the printing head, and to administer the amount of mist generated in conjunction with the ejection of ink droplets.

In general, a reflection optical sensor which is termed as a range sensor is used for detecting the thickness of a printing medium. The range sensor has its optical system configured of a light-projecting element such as a LED (light emitting diode) or a laser and a light-receiving element such as a PSD (position sensitive detector) or a line sensor. Light radiated from the light-projecting element is reflected at a measuring object, and the light-receiving element receives the reflected light. The center of power of the reflected light received by the light-receiving element (or the position at which the light-receiving element receives the strongest power of the reflected light) changes as the distance between the sensor and the measuring object changes. For this reason, once the light-receiving element detects the position of the center of power of the reflected light, it is possible to calculate the distance between the sensor and the measuring object by triangulation method or the like.

The measurement of the density and the like of a predetermined pattern printed on a printing medium is effective for adjusting the density of an output image, and for controlling landing positions of the ink droplets. In the case of the ink jet printing apparatus, when the amount of ink droplets ejected from the printing head (the ink ejection volume) changes, or is different from one ink color to another, the density and hue of an outputted image become unstable. With this taken into consideration, multiple output conversion tables are beforehand set up in order that an output signal corresponding to an input signal can be changed depending on an ink ejection volume so as to cause a relationship between the input signal and the density of the output image to remain stable independent of the ink ejection volume. Then, for each of multiple ink colors, a predetermined gradation pattern printed in a single-color ink is printed and the density of each pattern is detected with its density sensor. Thereby, it is possible to set up an appropriate output table for each ink color depending on given detection values.

A reflection optical sensor of a type including light-emitting elements such as LEDs having red, green and blue light-emitting wavelengths as well as light-receiving elements sensitive to these wave ranges is often used for the sensor for detecting densities of the multiple color patterns. Used is another reflection optical sensor of a type including a light-emitting element such as a white LED for emitting light having red, green and blue wavelengths, three filters for allowing the red, green and blue wavelengths out of the reflected light to be transmitted through the three filters, as well as light-receiving elements for receiving the transmitted light rays. Once light suitable for a light-absorbing characteristic of a single-color ink with which a gradation pattern is printed on a printing medium is radiated on the gradation pattern, the amount of reflected light corresponding to the radiated light changes depending on the density of the pattern. By detecting the amount of this reflected light with the light-emitting elements, the density of each pattern is capable of being obtained. When a detected density is higher than the reference density, such an output conversion table is selected in which an output signal corresponding to the gradation of the pattern (or the input signal) is set to be lower than its standard level. Meanwhile, when the detected density is lower than the reference density, another output conversion table is selected in which an output signal corresponding to the gradation of the pattern (or the input signal) is set to be higher than its standard level. The foregoing density detection method is disclosed in, for example, Japanese Patent Application laid-open No. Hei05-346626.

As is often the case with the foregoing various types of optical sensors, each optical sensor is attached to a carriage, which scans with a printing head for ejecting inks being mounted on the carriage, and is positioned by the carriage at a location of an object printing medium in a detection. However, such a configuration causes the optical sensor to be exposed to an ink mist which occurs in conjunction with the ejection of inks from the printing head, and thereby to be gradually smeared as the number of printings increases. To put it concretely, the mist means fine ink droplets which are generated in conjunction with the ejecting operation of the printing head and due to rebound of ink droplets from the printing medium, and which float in the air between the printing head and the printing medium because of their slow velocities. When a printing operation is carried out with such a generation of mist having occurred, the mist floats in conjunction with the movement of the carriage, and part of the mist adheres to surfaces of the elements of the optical sensor. Once the mist adheres to the light-emitting elements and the light-receiving elements, the light is blocked by the mist. Then, the amount of light emitted from each light-emitting element and received by each light-receiving element accordingly reduces, resulting in decrease in the performance of the sensor itself. As a result, the various controls fail to be effectively carried out, which controls are to be made on the basis of a result of detection by each sensor. For this reason, in the case of the ink jet printing apparatus having the foregoing configuration, it is desirable that the function of the optical sensor should be recovered by providing the optical sensor with a maintenance service, adjustment or replacement with a new one, at an appropriate time. In this case, it is required that the timing for the function of the optical sensor to be recovered should be evaluated exactly so as to avoid an unnecessary maintenance service and an unnecessary replacement with a new optical sensor.

For example, Japanese Patent Application laid-open No. 2004-291601 discloses a method in which a mode for checking on output conditions of the sensor is beforehand provided, and in which the amount of light (or power) outputted from the sensor is adjusted when the value representing an output from the sensor goes under a predetermined threshold value. Further disclosed is a method in which, when the output value does not exceed the predetermined value regardless of the adjustment of the amount of light, a user is informed of the necessity for replacing a protective member attached to the sensor with a new one. This method makes it possible to prevent, by recovering the function of the optical sensor depending on the necessity, or by informing a user of the life of the optical sensor and the timing for the protective member to be replaced with a new one, detection from being made under a condition where the sensor does not work well, even while the performance of the optical sensor gradually decreases as the number of printings increases.

However, like in the sensor for detecting densities of each color pattern, in the optical sensor including the light-emitting elements having the red, green and blue light-emitting wavelengths as well as the light-receiving elements sensitive to those wave ranges, how the performance decrease is different depends on the color of the ink mist adhering to the light-emitting elements and the light-receiving elements of the optical sensor. In other words, while a print is being made by using a specific ink color more than any other ink color, the adhered mists are accordingly dominated by the specific color. As a result, the adhered mists play a function of a filter for absorbing another specific color. This not only reduces the amount of light emitted from each of the light-emitting elements, but also distorts their spectral characteristics.

FIG. 8A is a diagram showing a result of comparison between a pre-printing spectral characteristic of a blue LED and a post-printing spectral characteristic of the blue LED, which was observed after a printing operation was carried out by using even amounts of all of the ink colors, while FIG. 8B shows a result of comparison between a pre-printing spectral characteristic of a blue LED and a post-printing spectral characteristic of the blue LED, which was observed after a printing operation was carried out by using a yellow ink color only. In each of FIGS. 8A and 8B, the solid line indicates the pre-printing spectral characteristic of a blue LED, while the dashed line indicates the post-printing spectral characteristic thereof. All the values of the spectral characteristics are normalized to be shown.

FIG. 8A shows a pre-printing spectral characteristic and a post-printing spectral characteristic which was observed after a printing operation was carried out by using even amounts of four colors (i.e. cyan, magenta, yellow and black). There is no difference between these characteristics. On the other hand, FIG. 8B shows the pre-printing spectral characteristic and a post-printing spectral characteristic which was observed after a printing operation was carried out by using only the yellow ink. It is learned from FIG. 8B that the post-printing characteristic is distorted at the longer wavelength side. This stems from a fact that the spectral transmission factor of the yellow ink against the blue LED spectral characteristic is different to a large extent between the shorter wavelength side and the longer wavelength side. Through close examination, the present inventors have found that particularly a combination of complementary colors, that is, the combination of the blue LED with the yellow ink as well as a combination of a green LED with a magenta color, tends to affect the spectral characteristic of its corresponding LED. It goes without saying that the spectral characteristic is not necessarily distorted by only the continued use of a single color ink. This phenomenon more or less takes place even in a case where a printing operation is carried out with several ink colors in combination. However, in the case where the multiple different ink colors are used as shown in FIG. 8A, the combination of the spectral transmission characteristics of the respective ink colors affects the spectral characteristics of the LEDs. As a result, the combination of the spectral transmission characteristics varies the spectral characteristics thereof less than the spectral transmission characteristic of the single color ink does.

When the densities are measured by use of the LEDs with their own distorted spectral characteristics as shown in FIG. 8B, the reflected light and the result of the detection are adversely affected. This makes it impossible to obtain a correct result of the detection. This means that the repeatability of the density measurement is likely to deteriorate in a case where the same printing apparatus is used for a long time period. In addition, the sensor may cease to function normally even in a case where the same printing apparatus is used for a short time period, as long as a printing operation is carried out by using a specific ink color only.

Even though, as disclosed in Japanese Patent Application laid-open No. 2004-291601, the method of determining whether or not the optical sensor is usable on the basis of the value representing the output (or power) from each of the light-receiving sensors is adopted under this kind of condition, it is impossible to evaluate how the performance decreases due to the distorted spectral characteristics. If a user is frequently requested to provide a maintenance service to the sensor for assurance, the frequent request reduces the usability.

SUMMARY OF THE INVENTION

The present invention has been made to solve the foregoing problems. An object of the present invention is to provide a method of exactly evaluating the performance of an optical sensor including light-emitting and light-receiving elements both handling multiple color light wavelengths even when a mist of color inks adheres to the optical sensor, as well as to provide a printing apparatus which carries out the method.

The first aspect of the present invention is a method of evaluating a performance of an optical sensor of an ink jet printing apparatus including a printing head for ejecting a plurality of ink colors on a basis of printing data and the optical sensor having a plurality of light-emitting elements whose light-emitting wavelengths are mutually different, comprising the steps of: counting a cumulative number of ejections, which is obtained by accumulating a number of times the printing head makes an ejection, for each ink color; obtaining an influence degree at which each of the plurality of light-emitting elements is affected by use of an influence coefficient indicating how much each of the ink colors affects each of the plurality of light-emitting elements as well as the cumulative number of ejections for each ink color; and evaluating the performance of the optical sensor by comparing the influence degree with a predetermined threshold value, thus evaluating the performance of the optical sensor.

The second aspect of the present invention is an ink jet printing apparatus comprising: a printing head for ejecting a plurality of ink colors on a basis of printing data; an optical sensor including a plurality of light-emitting elements whose light-emitting wavelengths are mutually different; a counting unit which counts a cumulative number of ejections, which is obtained by accumulating a number of times the printing head makes an ejection, for each of the ink colors; an obtaining unit which obtains an influence degree at which each of the plurality of light-emitting elements is affected by use of an influence coefficient indicating how much each of the ink colors affects each of the plurality of light-emitting elements as well as the cumulative number of ejections for each ink color; and an evaluating unit which evaluates the performance of the optical sensor by comparing the influence degree with a predetermined threshold value, thus evaluating the performance of the optical sensor.

Further features of the present invention will become apparent from the following description of exemplary embodiments (with reference to the attached drawings).

DESCRIPTION OF THE EMBODIMENTS

Detailed descriptions will be provided hereinbelow for the embodiments of the present invention with reference to the drawings.

First Embodiment

Figure 1:
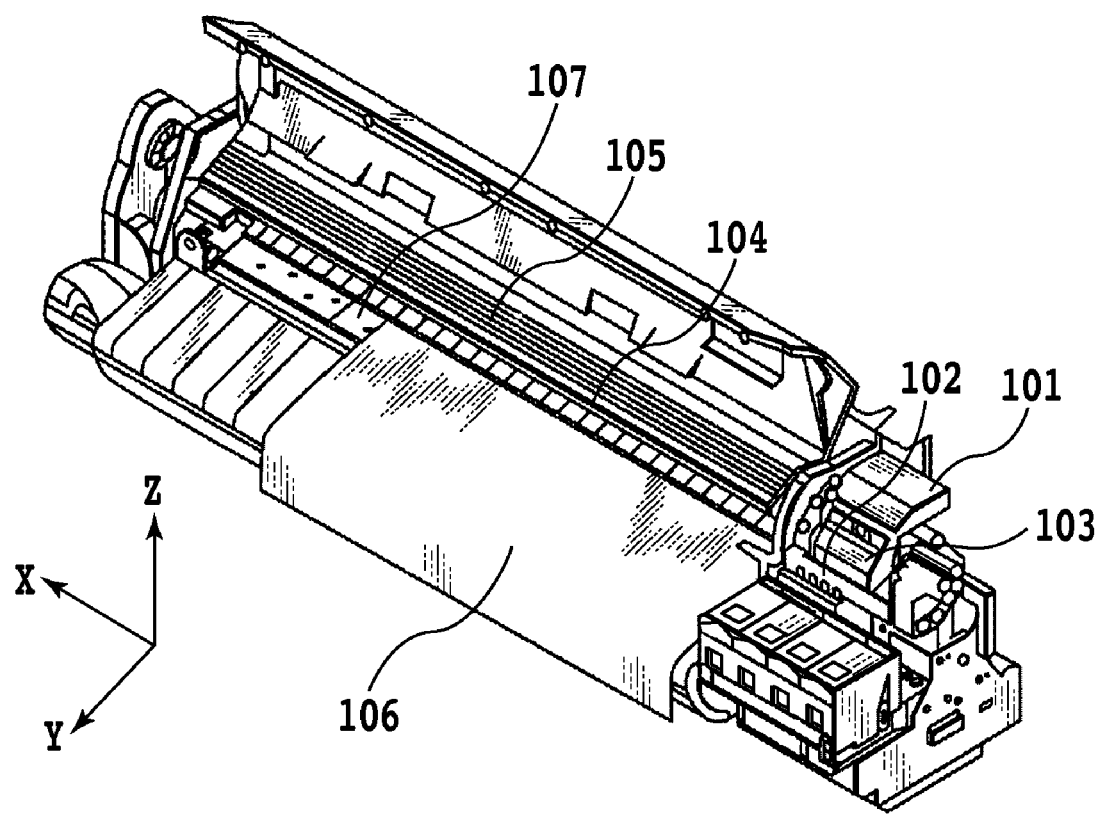
FIG. 1 is a perspective view of an example of an inner configuration of an ink jet printing apparatus which is usable for the present invention.

FIG. 1 is a perspective view illustrating an internal configuration of an ink jet printing apparatus which is usable for the present invention. An optical sensor 102 used for various detecting operations and a printing head 103 from which to eject four color inks depending on printing data are mounted on a carriage 101. The carriage 101 scans on a shaft 105 in a reciprocating manner in an X direction in response to the rotational movement of the conveying belt 104. On the other hand, a printing medium 106 is intermittently conveyed in the Y direction by not illustrated conveying rollers. An area on the printing medium 106 which is supported by a platen 107 in the Z direction constitutes a printed area by printing head 103.

During a printing operation, the printing head 103 mounted on the carriage 101 performs a printing scan on the printing medium 106, which has been conveyed to a predetermined position by the conveying rollers. In other words, while the carriage 101 is moving in the X direction, the printing head 103 ejects inks to the printing medium 106 at an appropriate timing depending on the printing data. Once the printing scan is completed, the conveying rollers convey the printing medium 106 by a predetermined length in the Y direction, and thus position on the platen 107 an area in the printing medium 106 on which the printing head 103 performs the next printing scan. An image is formed on the printing medium 106 on a step-by-step basis by repeating such a printing scan and such a conveying operation in turns.

Figure 2:
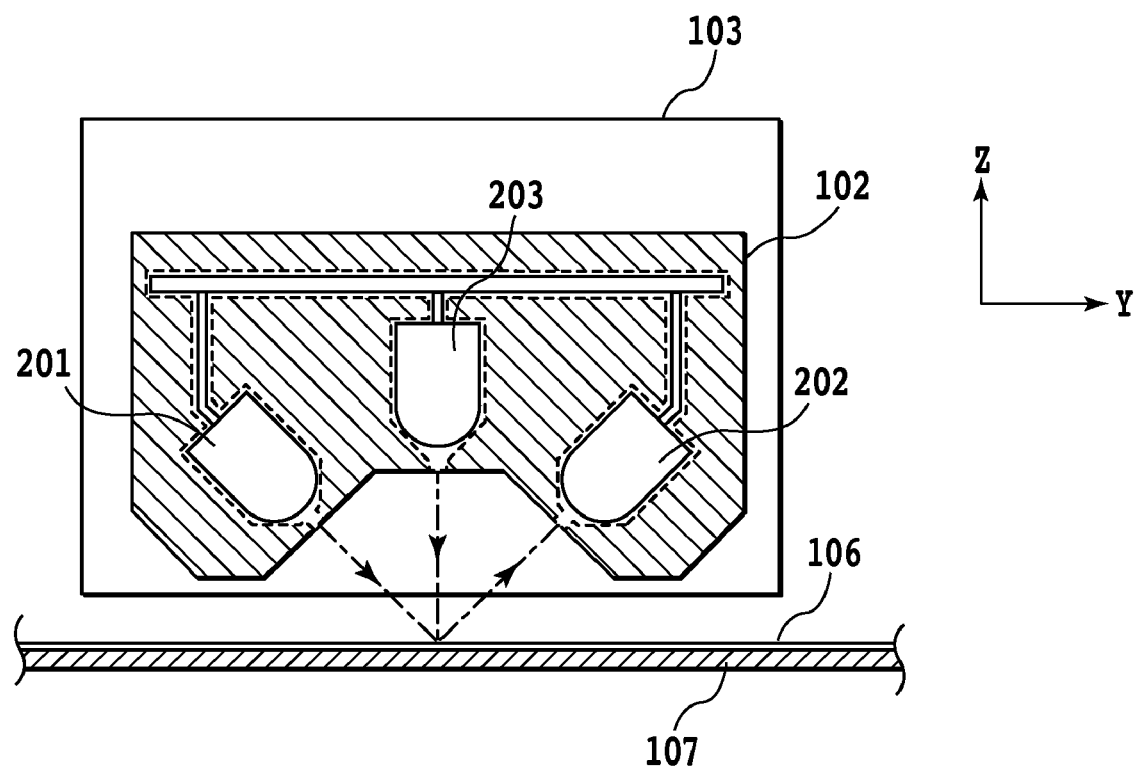
FIG. 2 is a side view illustrating how each optical element is arranged in an optical sensor which is adopted for an embodiment of the present invention.

FIG. 2 is a side view illustrating how each optical element is arranged in the optical sensor 102 which is adopted for the present embodiment. The optical sensor 102 adopted for the present embodiment is configured of two light-emitting elements 201 and 203 as well as a light-receiving element 202. The light-emitting element 201 is a red LED, and is arranged in a way that the center axis of light radiated from the light-emitting element 201 falls incident on the normal of the printing medium 106 at an angle of 45 degrees. The light-receiving element 202 is a photodiode, and is arranged in a position to receive, at the regular reflection angle, the light radiated from the light-emitting element 201. The light-emitting elements 203 are visible light LEDs, and emit three light rays which include a red light ray (with a light-emitting wavelength of approximately 620 nm to 640 nm), a green light ray (with a light-emitting wavelength of approximately 510 nm to 530 nm) and a blue light ray (with a light-emitting wavelength of approximately 460 nm to 480 nm). The light-emitting elements 203 are arranged in a way that the center of the reflection surface of the light-emitting element 203 coincides with the center of the reflection surface of the light-emitting element 201 on the printing medium 106. The photodiode 202 receives reflected light which scatters from the LED 203 at a degree of 45 degrees. The light-receiving area of the photodiode 202 is adjusted by an opening portion formed by a covering member of the optical sensor 102. In this case, the photodiode 202 is designed to receive reflected light which reflects at a square with sides of 2 mm on the printing medium 106. The radiation areas of the respective LEDs 201 and 203 are adjusted to be wider than the light-receiving area of the photodiode 202.

Figure 3:
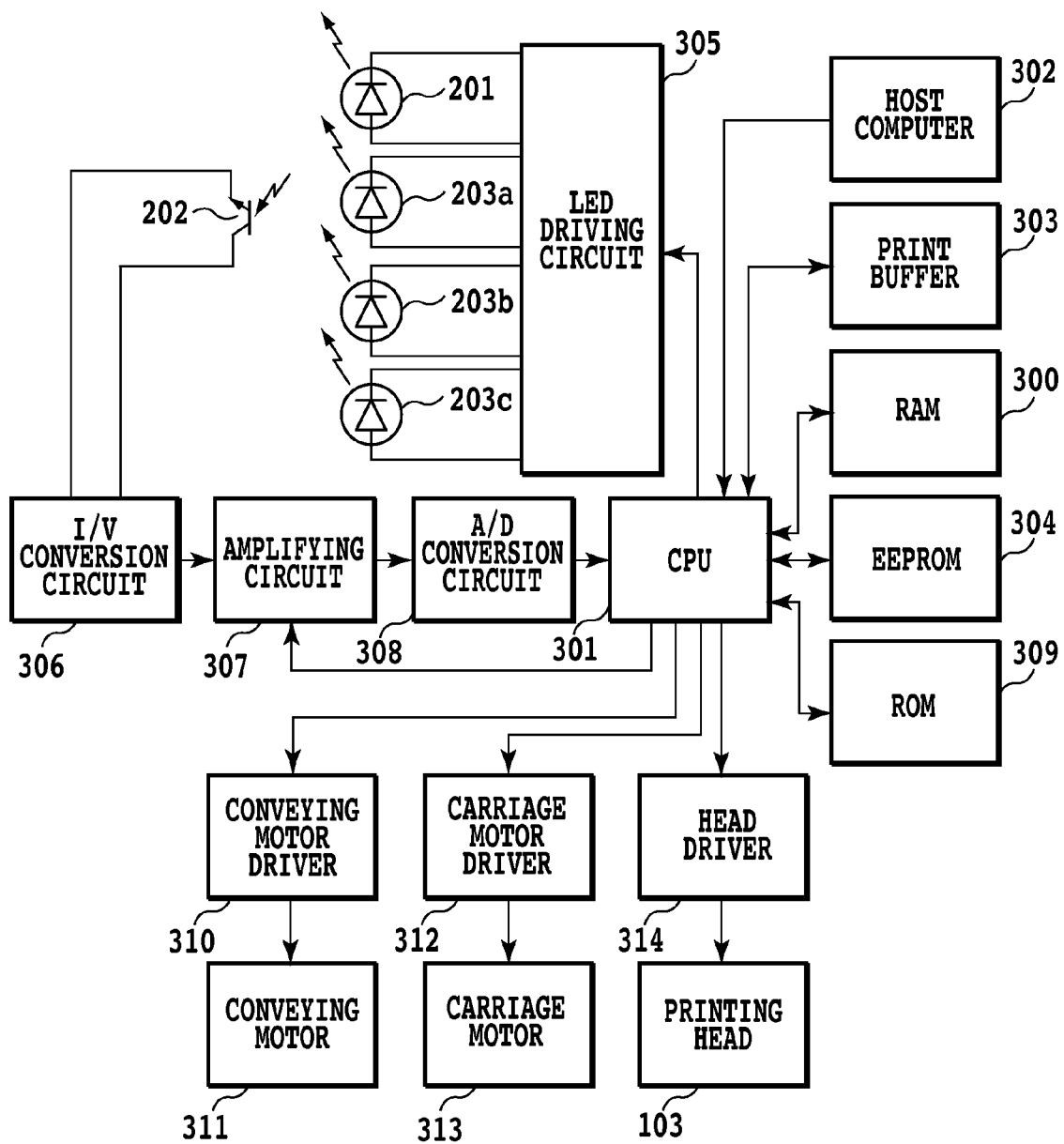
FIG. 3 is a block diagram illustrating a configuration for chiefly controlling a density correction in an ink jet printing apparatus which is adopted for the embodiment of the present invention.

FIG. 3 is a block diagram illustrating a configuration for chiefly controlling a density correction in the ink jet printing apparatus which is adopted for the present embodiment. A CPU 301 controls various arithmetic processes and the entire printing apparatus in accordance with control programs, parameters and various tables which are stored in a ROM 309. A RAM 300 is used as a work area for the CPU 301 to make such controls.

An image data sent from a host computer 302 externally connected to the ink jet printing apparatus is received by the CPU 301 via an interface, which is not illustrated in FIG. 3. The CPU 301 converts the received image data to printing data which the printing apparatus is capable of processing, that is, printing signals each representing cyan, magenta, yellow and black, as well as subsequently stores the printing signals in a print buffer 303. Each of the printing signals stored in the print buffer 303 is a binary signal indicating whether a dot of its corresponding ink color should be printed in pixels (1) or not (0). By counting the number of pieces of printing data (1) only, the CPU 301 is capable of obtaining the number of ejections for each ink color. The CPU 301 adds the number of ejections obtained for each ink color in this manner to a prior cumulative number of ejections stored in an EEPROM 304 for the same ink color, and thus obtains an updated cumulative number of ejections for each ink color, hence overwriting the updated cumulative number for each color.

In accordance with an instruction from the CPU 301, an LED driving circuit 305 turns on and off the LEDs 201 and 203 arranged inside the optical sensor 102. In this case, the red, green and blue light rays included in the visible light LEDs 203 are shown as being outputted from the three LEDs (denoted by 203a, 203b and 203c) respectively for convenience.

The photodiode 202 generates an electric current depending on the intensity of light received by the photodiode. This electric current is converted to a voltage by an I/V conversion circuit 306, and subsequently is amplified to an appropriate level by an amplifier circuit 307. An output voltage from the amplifier circuit 307 is monitored by the CPU 301. The CPU 301 is capable of adjusting the gain level in order that the post-amplified voltage should be equal to a value appropriate for an A/D conversion. After amplified to the level represented by the appropriate value, the voltage is converted to a 10-bit digital signal by the A/D conversion circuit 308, and is thus temporarily stored in a RAM 300.

In accordance with an instruction from the CPU 301, a conveying motor driver 310 drives a conveying motor which produces a force for conveying the printing medium. Furthermore, in accordance with an instruction from the CPU 301, a carriage motor driver 312 drives a carriage motor 313 which produces a force for moving the carriage 103. Moreover, in accordance with an instruction from the CPU 301, the head driver 314 drives the printing head 103 in order that inks should be ejected from the printing head 103 on the basis of the printing data stored in the print buffer 303.

Figure 4:
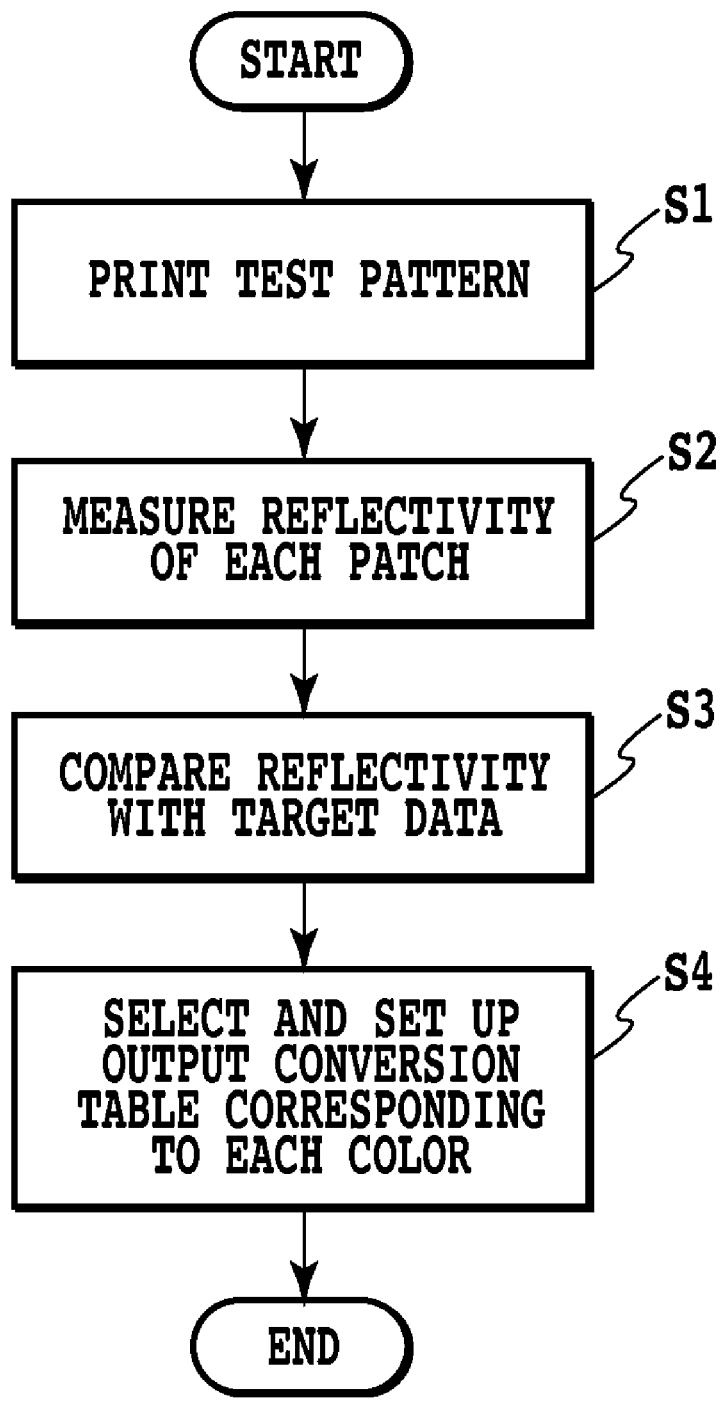
FIG. 4 is a flowchart illustrating steps in a mode for a density correction for each color (color calibration) which are carried out by a CPU according to the embodiment of the present invention.

FIG. 4 is a flowchart illustrating steps in a mode for a density correction for each color (color calibration) which are carried out by a CPU 301 according to the present embodiment.

A user can instruct the ink jet printing apparatus to perform a color calibration, for example, when the printing head is replaced with a new one. Once the color calibration is started, the CPU 301 controls the conveying motor driver 310 to cause a printing medium to be fed in. Subsequently, the CPU 301 controls the conveying motor driver 310, the carriage motor driver 312 and the head driver 314, as well as thereby causes a test pattern for the color calibration, which is beforehand stored in the ROM 309, to be printed (in step S1). In general, this test pattern is made up of multiple patches (for example, 16 patches per color×4 colors=64 patches) corresponding to multiple gradations (for example, 16 gradations) for each of cyan, magenta, yellow and black.

Once the printing of such a test pattern is completed, the CPU 301 measures the reflectivity of each patch by use of the optical sensor 102 without discharging the printing medium (in step S2). Specifically, the CPU 301 turns on a LED out of the LEDs 203 through the LED driving circuit 305 corresponding to the color of the measurement object patch, and causes the carriage 103 to scan in a way that the measurement area of the photodiode 202 can pass over the object patch. Thereby, the CPU 301 obtains the intensity of reflected light which is received by the photodiode 202, and which is subsequently converted to the 10-bit data by the A/D conversion circuit. Thereafter, the CPU 301 finds a ratio of the obtained intensity of the reflected light to its reflection intensity in the white area on the printing medium. Subsequently, as the reflectivity of the object patch, this ratio is temporarily stored in the RAM 300. The CPU 301 carries out such steps for a patch corresponding to each gradation in each color.

An LED which is turned on when the intensity of reflected light is measured is selected in order that the color of light emitted from the LED should be a color complementary to the color of an object patch. Specifically, the blue LED is turned on when the reflectivity of each yellow patch is measured; the green LED is turned on when the reflectivity of each magenta patch is measured; and the red LED is turned on when the reflectivity of each cyan patch is measured. A purpose for which the LEDs whose colors are the complementary colors are used as light sources is to widen the dynamic range of the reflected light as much as possible. Any color of LEDs can be preferably used for the black patches, because the black patches exhibits a conspicuous light-absorbing characteristic against the full range of visible light band.

In the subsequent step S3, the CPU 301 compares the reflectivity of a patch corresponding to each gradation in each color which is temporarily stored in the RAM 300 with each corresponding target data stored beforehand in the ROM 309. The target data means an ideal reflectivity which is provided for each gradation for each color. When the measured reflectivity of a certain patch is larger than the corresponding target data, the density of the certain patch is lower than an ideal density. By contrast, when the measured reflectivity of a certain patch is lower than the corresponding target data, the density of the certain patch is higher than an ideal density.

The CPU 301 compares the reflectivity of a patch corresponding to each gradation with its target data for each ink color, and thus selects an appropriate table out of multiple output conversion tables stored in the ROM 309 on the basis of a comprehensive result of the comparison. By storing the selected table in the EEPROM 304, the CPU 301 sets up an output conversion table corresponding to each ink color (in step S4). Specifically, in a case where it is determined, for example, that the reflectivity of a patch corresponding to each gradation is comprehensively higher than the corresponding target data, it is determined that the density of each patch is lower than its corresponding ideal density, and an output conversion table which sets up an output signal whose level is higher than that of an input signal is accordingly set up. By contrast, in a case where it is determined that the reflectivity of a patch corresponding to each gradation is comprehensively lower than the corresponding target data, it is determined that the density of each patch is higher than its corresponding ideal density, and another output conversion table which sets up an output signal whose level is lower than that of an input signal is accordingly set up.

The color calibration according to the present embodiment ends with the operations described in the preceding paragraph. After this, when the ink jet printing apparatus carries out a regular printing operation, the CPU 301 corrects and converts input signals to corresponding output signals by use of the output conversion tables set up for each ink color. This makes the ink jet printing apparatus capable of realizing an ideal density and color development for not only the primary colors but also a combination color, that is, a secondary color.

The amounts of inks ejected from a printing head more or less vary from one printing head to another, or from one ink color to another, this variance being occurred due to the manufacturing process. For this reason, when the printing head attached to the printing apparatus is replaced with a new one, the color development of an image obtained after the replacement is different from that of the same image obtained before the replacement in some cases. Even in these cases, the printing apparatus is capable of keeping the color development of the image in an ideal condition before and after the replacement by carrying out the foregoing color calibration. The foregoing color calibration can be carried out when the printing head is replaced with a new one, or whenever deemed necessary by a user.

Figure 5:
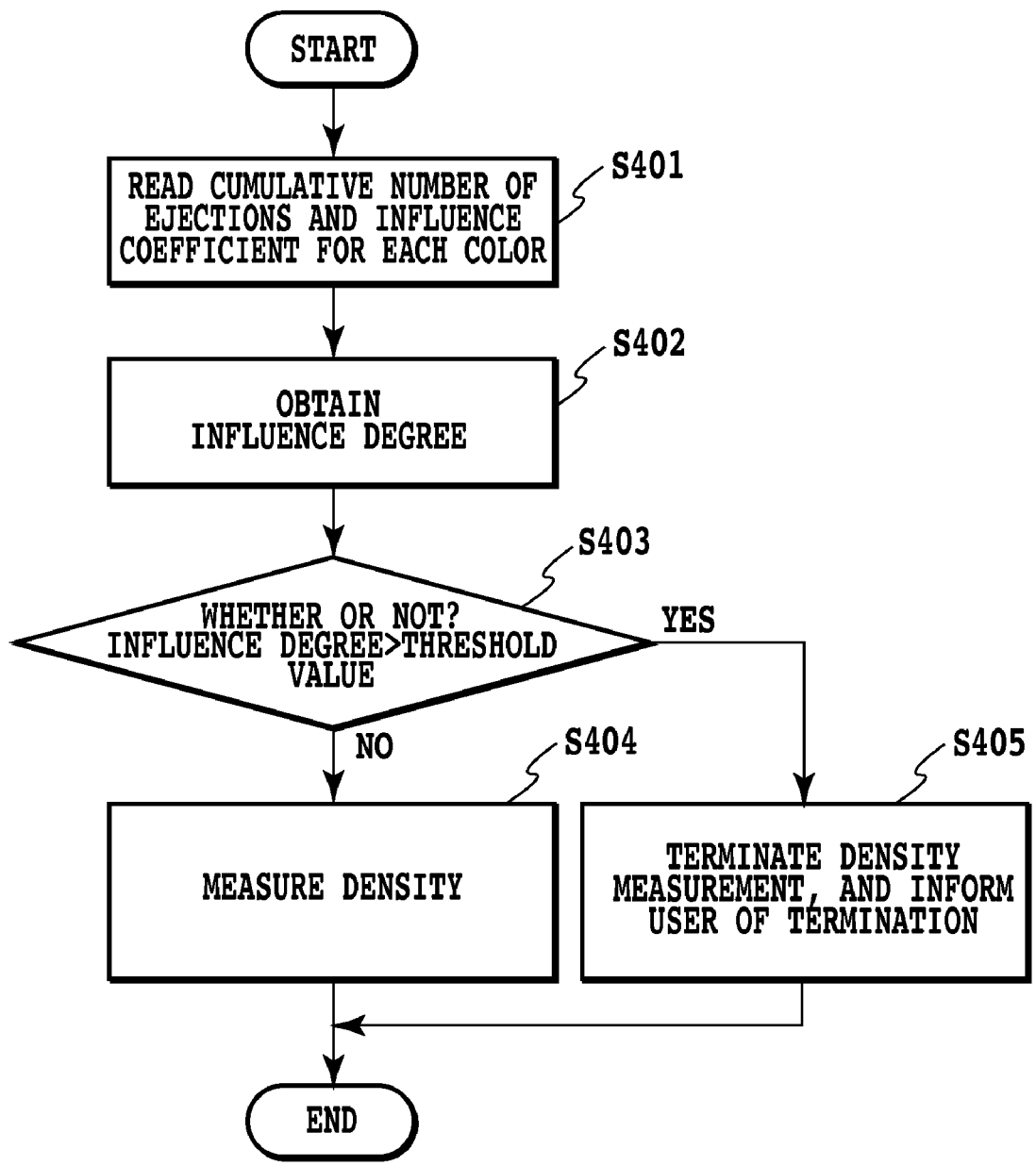
FIG. 5 is a flowchart illustrating steps in a mode for evaluating the performance of the optical sensor which are carried out by the CPU according to the embodiment of the present invention.

Descriptions will be provided next for an operation of evaluating the performance of the optical sensor 102, which is characteristic of the present invention. FIG. 5 is a flowchart illustrating steps in a mode for evaluating the performance of the optical sensor which are carried out by the CPU 301 according to the embodiment of the present invention. The mode for evaluating the performance of the optical sensor is carried out as a preceding step of measuring the reflectivity with the optical sensor 102 (for example, as a preceding step of step S2 in FIG. 2).

Once the mode for evaluating the performance of the optical sensor is started, the CPU 301 reads the current cumulative number of ejections (D) of each color ink and an influence coefficient (C) indicating how much each ink color affects each LED, which are stored in the EEPROM 304, for each ink color. In this respect, the current cumulative number of ejections is a value obtained by accumulating the numbers of ejections after the current optical sensor is attached to the printing apparatus, or after the last maintenance process is applied to the current optical sensor, for each color. The reason why the cumulative number of ejections is obtained for each color to evaluate the performance of the optical sensor is that a correlation exists between the cumulative number of ejections for each ink color and the amount of mist for each ink color, which deteriorates the performance of the optical sensor 102 adhering to the optical sensor 102.

On the other hand, the influence coefficient is a coefficient determining how easy to adhere to the optical sensor 102 each ink color is, or how much each ink color distorts the spectral characteristic of each LED. In the present embodiment, the influence coefficient is a value in a range of −1.0 to +1.0. Use of inks each with a larger influence coefficient decreases the performance of the optical sensor earlier than with a smaller influence coefficient. Such an influence coefficient is stored in the EEPROM. Descriptions will be provided later for how to determine the value.

Once the CPU 301 completes reading the cumulative number of ejections and the influence coefficient for each color in step S401, the CPU 301 obtains an influence degree (or an influence level) (R) on the basis of the cumulative number of ejections (D) and the influence coefficient (C) which are obtained for each color. The influence degree (R) indicates how much each of the three LEDs is affected by the corresponding mist and is a parameter which takes on a positive or negative value around zero. The larger the absolute value of the influence degree is, the lower the precision of measuring of density. In the case where the ink colors used for a printing operation are yellow (Y), magenta (M), cyan (C) and black (K), the influence degree Rs corresponding to the red (R), green (G) and blue (B) LEDs are calculated by use of the following equation.

$$\begin{pmatrix} R_R \\ R_G \\ R_B \end{pmatrix} = \begin{pmatrix} C_{RY} & C_{RM} & C_{RC} & C_{RK} \\ C_{GY} & C_{GM} & C_{GC} & C_{GK} \\ C_{BY} & C_{BM} & C_{BC} & C_{BK} \end{pmatrix} \begin{pmatrix} D_Y \\ D_M \\ D_C \\ D_K \end{pmatrix} \quad \text{(Equation 1)}$$

It is learned from the aforementioned equation that, even when the cumulative number of ejections takes on a large value, there is a case where the influence degree may be small depending on the influence coefficient C. In this case, for example, the mists of each ink color do not affect the performance of the optical sensor because the mists of each ink color are generated in a relatively well-balanced manner, although the amount of light decreases due to the adherence of the mists to the optical sensor. In addition, even when the cumulative number of ejections for a certain ink color takes on a small value, the influence degree R increases if the influence coefficient of the ink color is large while the cumulative number of ejections for an ink color which assumes an inverse influence coefficient is small. Regardless of the total of the cumulative numbers of ejections for all of the ink colors, the influence degree R changes depending on which ink color has been used more than any other ink color.

Here, a supplemental description about the influence coefficient will be provided. For simplicity, it is assumed that a combination of cumulative number of ejections for each color ink (a combination 1) is $(D_Y:D_M:D_C:D_K=5:1:1:1)$, and another combination of cumulative number of ejections for each color ink (a combination 2) is $(D_Y: D_M: D_C: D_K=2:2:2:2)$. In the combination 1, a cumulative number of ejections $(D_Y)$ for yellow (Y) is five times as much as that for other colors. On the other hand, in the combination 2, cumulative numbers of ejections for each color are the same. In this case, for example, sum of cumulative numbers of ejections for four colors of the combination 1 is the same as that of the combination 2. However, an influence degree R against the blue LED in the combination 1 is five times as much as that in the combination 2. It means that the influence coefficient of yellow ink against the blue LED is large. The influence coefficient C is a coefficient relating to a degree of bias (excessive emphasis) of cumulative numbers of ejections among multiple ink colors. In other words, the influence coefficient C is a coefficient relating to a degree of homogeneity of cumulative number of ejections among multiple ink colors.

Once the influence degree R at each corresponding LED is obtained in step S402, the CPU 301 proceeds to step S403, where the CPU 301 reads a judgment threshold value which is beforehand stored in the EEPROM 304, and thus compares this threshold value with each absolute value of the influence degree R at each corresponding LED. In this respect, the judgment threshold value is the absolute value of the influence degree corresponding to a tolerance limit of LED precisions and is common among the LEDs without respect to the LEDs. Detailed descriptions will be provided later for how to determine the judgment threshold value.

In a case where the absolute value of the influence degree is smaller than the threshold value, as a result of the comparison made in step S403, the CPU 301 determines that the performance of the optical sensor is sufficient to measure the densities (or the reflectivities), and proceeds to step S404. In step S404, the CPU 301 performs the predetermined density measuring operation. On the other hand, in the case where the absolute value of the influence degree is not smaller than the threshold value in step S403, the CPU 301 determines that the performance of the optical sensor is insufficient to measure the densities (or the reflectivities), and proceeds to step S405. The CPU 301 terminates the density measuring operation, and informs the user of the termination of the density measuring operation. The CPU 301 ends the process with step S404 or S405.

It should be noted that, after the CPU 301 informs the user of the termination of the density measuring operation in step S405, the user may be recommended to perform a maintenance process on the optical sensor, or may be recommended to replace the optical sensor with a new one if the optical sensor is replaceable. After the user carries out any one of the two processes, the CPU 301 resets the cumulative number of ejections for each color stored in the EEPROM 304.

Descriptions will be provided next for how to appropriately set up the influence coefficients C which are used to obtain the influence degree. In the case of the present embodiment, a judgment whether or not each influence coefficient C is appropriate value is capable of being made by measuring the reflectivities by use of the LEDs to which the mists actually adhere.

First of all, before and after a printing operation by use of any single-color ink, the reflectivities are measured by use of corresponding LEDs. Subsequently, the amount of difference between the pre-printing reflectivity and the post-printing reflectivity is obtained. Specifically, the reflectivity is measured by use of the LED to which no mist adheres, and the reflectivity is measured by use of the same LED to which mists adhere. Thereafter, the amount of difference between the reflectivities is calculated. The measurement of the reflectivities and the calculation of the amount of difference between the reflectivities are carried out for each of the four inks. Here, when the post-printing reflectivity (or the mist-adhesion reflectivity) is lower than the pre-printing reflectivity, or when the post-printing reflectivity indicates that the density becomes higher, the amount of the difference takes on a positive value. On the other hand, when the post-printing reflectivity (or the mist-adhesion reflectivity) is higher than the pre-printing reflectivity, or when the post-printing reflectivity indicates that the density becomes lower, the amount of difference takes on a negative value. The amount of difference is calculated for each of all combinations (4 colors×3 LEDs=12 combinations). By normalizing using the absolute value of the amount of difference which is the largest among the twelve amounts of difference, the influence coefficient for each combination is obtained in a range of −1.0 to +1.0. In the present embodiment, the influence coefficients thus obtained are stored in the EEPROM 304, and are read by the CPU 301 when the CPU 301 performs the density measuring operation.

Subsequently, descriptions will be provided for how to determine the threshold value which is compared with each influence degree (R) at corresponding one of the LEDs in step S403. In the present embodiment, the judgment threshold value used for evaluating the precision of the optical sensor 102 is determined depending on how large a measurement error of each reflectivity is tolerable. In a case where, for example, a measurement error which is within 1% is intended to be tolerated from the viewpoint of the quality of an output image, it suffices to beforehand find the cumulative number of ejections which makes the measurement error equal to 1% experimentally. Specifically, in a case where, for example, the influence coefficient $C_{BY}$ indicating how much the yellow ink affects the blue LED is 0.8, the cumulative number of ejections of the yellow ink which makes the measurement error equal to 1% is found by repeating the printing operation using only the yellow ink and the measurement of a reflectivity error. In a case where the cumulative number of ejections thus found is, for example, $1.0 \times 10^x$, the judgment threshold value is $0.8 \times 10^x$. In this case, if the influence coefficient of the magenta ink is, for example, −0.2, the density measurement error becomes equal to 1% when the cumulative number of ejections reaches $4.0 \times 10^x$ by carrying out the printing operation by use of only the magenta ink.

In the case of the present embodiment, as described above, the performance of the optical sensor is evaluated by evaluating how much the performance of the optical sensor decreases, on the basis of the cumulative number of ejections for each used ink color and of the degree at which each ink affects each LED. This makes it possible not only to beforehand prevent the amount of light from decreasing due to the amount of mists adhering to the optical sensor, but also to beforehand prevent an inaccurate reflectivity (or an inaccurate density) from being detected due to the change in the spectral characteristic of each LED.

Second Embodiment

Descriptions will be provided hereinbelow for a second embodiment of the present invention. The ink jet printing apparatus, the optical sensor and the color calibration shown in FIGS. 1 to 5 are adopted for the present embodiment, like for the first embodiment.

How easy to adhere to the optical sensor 102 a mist which occurs during printing operation is affected by the temperature and humidity during the printing operation. In the present embodiment, with this fact taken into consideration, the cumulative number of ejections for each color is to be corrected depending on the temperature and humidity during a printing operation. Thereby, the performance of the optical sensor 102 is to be more precisely evaluated in the present embodiment than in the first embodiment. To this end, the printing apparatus according to the present embodiment includes temperature-humidity detecting means for detecting the temperature and humidity around the apparatus. In addition, along with the updated cumulative number of ejections, an adhesion coefficient conversion table A with which to correct the counted cumulative number of ejections is stored in the EEPROM 304.

Figure 6:
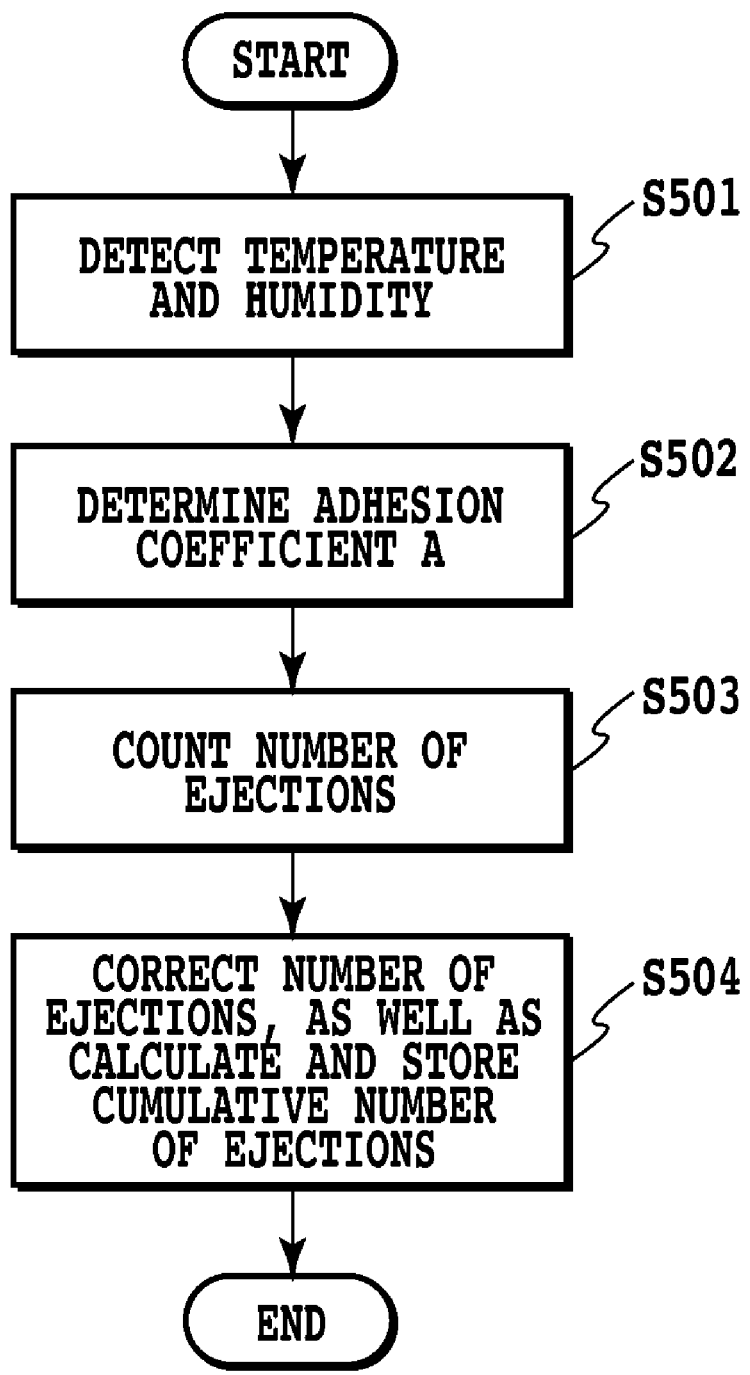
FIG. 6 is a flowchart illustrating steps which a CPU according to a second embodiment of the present invention carries out to obtain a cumulative number of ejections during a printing operation.

FIG. 6 is a flowchart illustrating steps which the CPU 301 carries out to obtain a cumulative number of ejections during a printing operation. Once the process is started, first of all, the CPU 301 acquires the ambient temperature and humidity with the temperature-humidity detecting means attached to the inside of the printing apparatus in step S501.

In the following step S502, the CPU 301 makes a reference to the adhesion coefficient conversion table A stored in the EEPROM 304, and thereby determines an appropriate mist adhesion coefficient A with the temperature and humidity acquired in step S501 taken into consideration. Here, the adhesion coefficient A is a coefficient uniquely determined depending on the combination of the temperature and the humidity, and represents, for each combination of the ambient temperature and humidity, how easy to adhere to the optical sensor a mist is. In addition, a value of 1 (one) is assigned to a degree of adhesion of the mist to the optical sensor under the experimental environment in which the judgment threshold value is determined. Values larger than 1 (one) are assigned to the respective combinations of temperatures and humidities which make the mist easier to adhere to the optical sensor, while values smaller than 1 (one) are assigned to the respective combinations to make the mist less easy to adhere to the optical sensor than the combination to which the value of 1 (one) is assigned. The mist adhesion coefficient conversion table A is a table in which these adhesion coefficients A are stored in association with the corresponding combinations of temperatures and humidities. Through their experiment, the present inventors have proved that the lower the ambient temperature and humidity become, the higher the adhesion coefficient A becomes.

Once the appropriate adhesion coefficient A is determined in step S502, the CPU 301 counts the number of ejections for each color while actually performing the printing operation (in step S503).

Once a predetermined amount of printing operation is completed, the CPU 301 corrects the number of ejections by multiplying the counted number of ejections for each color by the adhesion coefficient A determined in step S502. Furthermore, the CPU 301 reads the current cumulative number of ejections from the EEPROM 304, and adds the current cumulative number of ejections to the post-corrected number of ejections. Thereby, the CPU 301 replaces the current cumulative number of ejections with the new number, and overwrites the new number on the EEPROM 304. With this, the CPU 301 ends this process.

In the present embodiment, as the number of ejections, a value larger than the actually counted number is added to the cumulative number of ejections in a case like that the printing operation is performed in an environment in which the mist is easier to occur. While, as the number of ejections, a value smaller than the actually counted number is added thereto in a case like that the printing operation is performed in an environment in which the mist is less easy to occur, as described above. Accordingly, it becomes possible to more precisely evaluate how much the mist affects the optical sensor 102, and thereby to more reliably evaluate the performance of the optical sensor, than the first embodiment does.

Third Embodiment

Descriptions will be provided hereinbelow for a third embodiment of the present invention. The ink jet printing apparatus, the optical sensor and the color calibration shown in FIGS. 1 to 5 are adopted for the third embodiment, like for the foregoing embodiments.

How easy to adhere to the optical sensor 102 a mist which occurs during a printing operation is affected by the distance to the paper, during the printing operation. In the present embodiment, with this fact taken into consideration, the cumulative number of ejections for each color is to be corrected depending on the distance to the paper, during a printing operation. Thereby, the performance of the optical sensor 102 is to be more precisely evaluated in the present embodiment than in the first embodiment. To this end, the printing apparatus includes a range sensor using a PSD and the like, as described in the section entitled "DESCRIPTION OF THE RELATED ART," in addition to the optical sensor 102 for measuring the reflectivities. In addition, along with the updated cumulative number of ejections, an adhesion coefficient conversion table B to correct the counted cumulative number of ejections is stored in the EEPROM 304.

Figure 7:
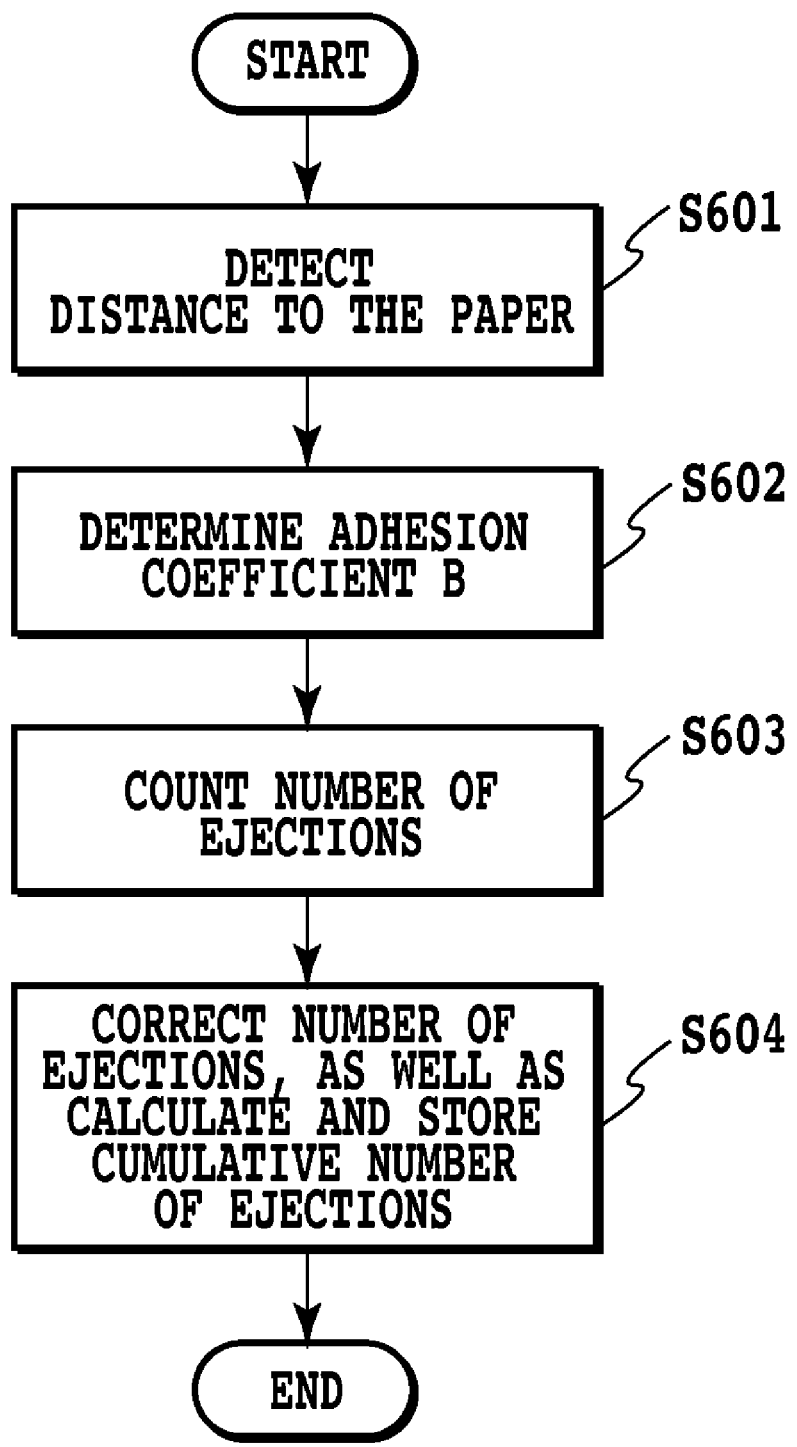
FIG. 7 is a flowchart illustrating steps which a CPU according to a third embodiment of the present invention carries out for obtaining a cumulative number of ejections during a printing operation.
Figure 8A:
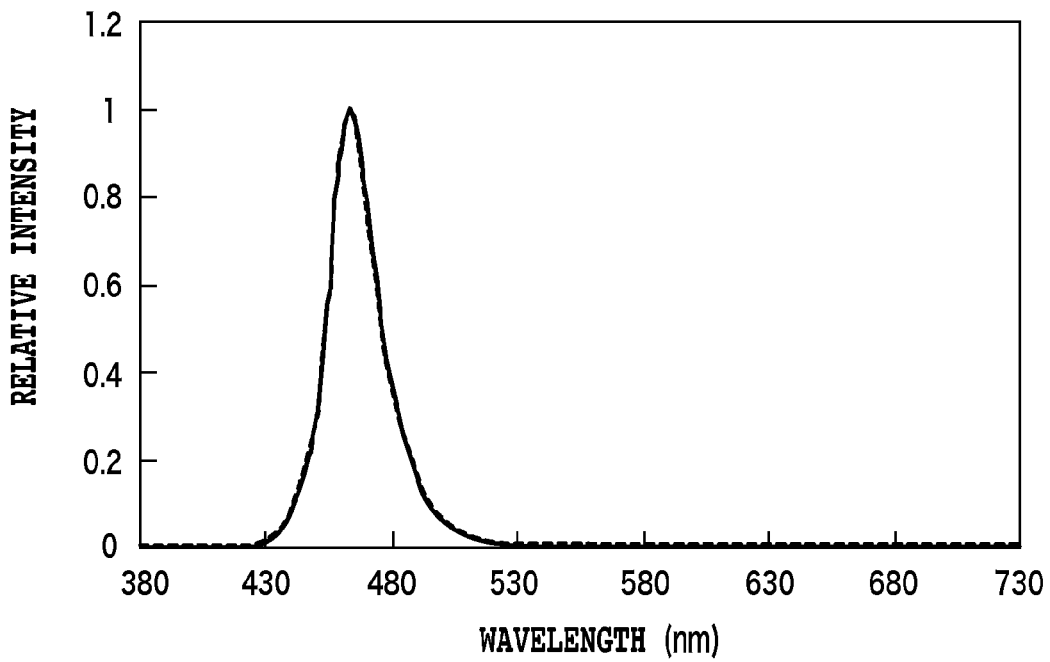
FIGS. 8A and 8B are diagrams showing a result of comparison among a pre-printing spectral characteristic of a blue LED, a post-printing spectral characteristic of the blue LED which was observed after a printing operation by using even amounts of all of the ink colors, and a post-printing spectral characteristic of the blue LED which was observed after a printing operation by using a yellow ink color only.
Figure 8B:
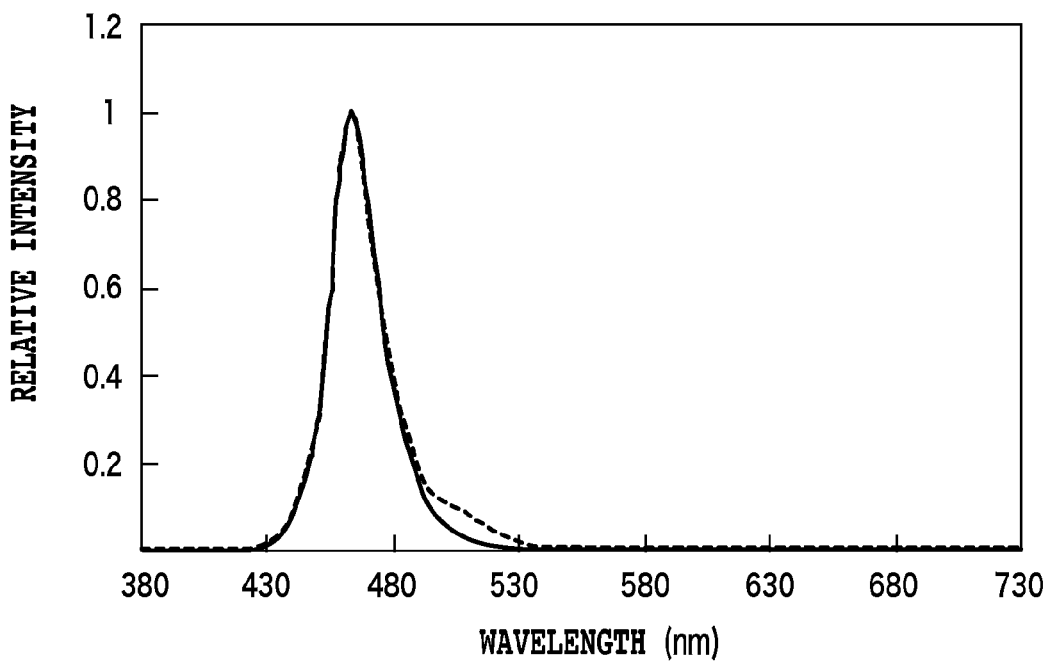

FIG. 7 is a flowchart illustrating steps which the CPU 301 carries out to obtain a cumulative number of ejections during a printing operation. Once the process is started, first of all, the CPU 301 measures the distance between a fed-in printing medium and the printing head with the range sensor.

In the following step S602, the CPU 301 makes a reference to the adhesion coefficient conversion table B stored in the EEPROM 304, and thereby determines an appropriate mist adhesion coefficient B with the distance to the paper, acquired in step S601 taken into consideration. Here, the adhesion coefficient B is a coefficient uniquely determined depending on the distance to the paper, and represents, for each distance to the paper, how easy to adhere to the optical sensor a mist is. In addition, a value of 1 (one) is assigned to a degree of adhesion of the mist to the optical sensor under the experimental environment in which the judgment threshold value is determined. Values larger than 1 (one) are assigned to the respective distances to the paper which make the mist easier to adhere to the optical sensor, while values smaller than 1 (one) are assigned to the respective distances to the paper which make the mist less easy to adhere to the optical sensor than the distance to the paper to which the value of 1 (one) is assigned. The mist adhesion coefficient conversion table B is a table in which these adhesion coefficients B are stored in association with the corresponding distances to the paper. Through their experiment, the present inventors have proved that the shorter the distance to the paper becomes, the smaller the amount of mist adhering to the optical sensor becomes, and that the longer the distance to the paper becomes, the larger the amount of mist adhering to the optical sensor becomes.

Once the appropriate adhesion coefficient B is determined in step S602, the CPU 301 counts the number of ejections for each color while actually performing the printing operation (in step S603).

Once a predetermined amount of printing operation is completed, the CPU 301 corrects the number of ejections by multiplying the counted number of ejections for each color by the adhesion coefficient B determined in step S602. Furthermore, the CPU 301 reads the current cumulative number of ejections from the EEPROM 304, and adds the current cumulative number of ejections to the post-corrected number of ejections. Thereby, the CPU 301 replaces the current cumulative number of ejections with the new number, and overwrites the new number on the EEPROM 304. With this, the CPU 301 ends this process.

In the present embodiment, as the number of ejections, a value larger than the actually counted number is added to the cumulative number of ejections in a case that the printing operation is performed with longer distance to the paper. On the other hand, as the number of ejections, a value smaller than the actually counted number is added to the cumulative number of ejections in a case that the printing operation is performed with shorter distance to the paper. Accordingly, it becomes possible to more precisely evaluate how much the mist affects the optical sensor 102, and thereby to more reliably evaluate the performance of the optical sensor, than the first embodiment does.

It should be noted that the second and third embodiments, which have been described above, can be carried out at a time. In this case, it suffices that a four-dimensional LUT, which enables an appropriate adhesion coefficient to be obtained depending on the acquired temperature, humidity and distance to the paper, is beforehand set up.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-120811, filed May 1, 2007, which is hereby incorporated by reference herein in its entirety.

What is claimed is:

1. A method of evaluating a performance of an optical sensor of an ink jet printing apparatus including a printing head for ejecting a plurality of ink colors on a basis of printing data and the optical sensor having a plurality of light-emitting elements whose light-emitting wavelengths are mutually different, said method comprising the steps of:
   counting a cumulative number of ejections, which is obtained by accumulating a number of times the printing head makes an ejection, for each ink color;
   obtaining an influence degree at which each of the plurality of light-emitting elements is affected by use of an influence coefficient indicating how much each of the ink colors affects each of the plurality of light-emitting elements as well as the cumulative number of ejections for each ink color; and
   evaluating the performance of the optical sensor by comparing the influence degree with a predetermined threshold value.

2. The method of evaluating a performance of an optical sensor according to claim 1, further comprising the step of correcting the cumulative number of ejections, which is counted in said counting step, by multiplying the cumulative number of ejections by a coefficient determined on a basis of a temperature and humidity.

3. The method of evaluating a performance of an optical sensor according to claim 1, further comprising the step of correcting the cumulative number of ejections, which is counted in said counting step, by multiplying the cumulative number of ejections by a coefficient determined on a basis of a distance between the printing head and a printing medium on which the printing head performs a printing operation.

4. An ink jet printing apparatus comprising:
   a printing head for ejecting a plurality of ink colors on a basis of printing data;
   an optical sensor including a plurality of light-emitting elements whose light-emitting wavelengths are mutually different;
   a counting unit which counts a cumulative number of ejections, which is obtained by accumulating a number of times the printing head makes an ejection, for each of the ink colors;
   an obtaining unit which obtains an influence degree at which each of the plurality of light-emitting elements is affected by use of an influence coefficient indicating how much each of the ink colors affects each of the plurality of light-emitting elements as well as the cumulative number of ejections for each ink color; and
   an evaluating unit which evaluates the performance of the optical sensor by comparing the influence degree with a predetermined threshold value.

5. The ink jet printing apparatus according to claim 4, wherein the printing head and the optical sensor are mounted on a carriage which reciprocatingly scans inside the ink jet printing apparatus.

6. The ink jet printing apparatus according to claim 4, further comprising a storing unit which stores the influence coefficient and the predetermined threshold value.

7. The ink jet printing apparatus according to claim 4, wherein the plurality of ink colors include cyan, magenta, yellow and black.

8. The ink jet printing apparatus according to claim 4, wherein the plurality of light-emitting elements include red, green and blue LEDs.

* * * * *